US009396042B2

(12) United States Patent
Smith et al.

(10) Patent No.: US 9,396,042 B2
(45) Date of Patent: Jul. 19, 2016

(54) METHODS AND SYSTEMS FOR EVALUATING HISTORICAL METRICS IN SELECTING A PHYSICAL HOST FOR EXECUTION OF A VIRTUAL MACHINE

(71) Applicant: Citrix Systems, Inc., Fort Lauderdale, FL (US)

(72) Inventors: Deane Smith, Leominster, MA (US); Brian Donegan, Newbury, MA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 618 days.

(21) Appl. No.: 13/652,121

(22) Filed: Oct. 15, 2012

(65) Prior Publication Data

US 2013/0042123 A1     Feb. 14, 2013

(51) Int. Cl.
    *G06F 9/46*     (2006.01)
    *G06F 9/455*     (2006.01)
    *G06F 1/00*     (2006.01)
    *G06F 9/50*     (2006.01)

(52) U.S. Cl.
    CPC ............ *G06F 9/5094* (2013.01); *G06F 9/5077* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| 8,489,744 B2* | 7/2013 | Elyashev ............ H04L 67/1002 709/226 |
| 2004/0143664 A1 | 7/2004 | Usa et al. |
| 2006/0167984 A1 | 7/2006 | Fellenstein et al. |
| 2006/0259621 A1 | 11/2006 | Ranganathan et al. |
| 2007/0130566 A1 | 6/2007 | van Rietschote et al. |
| 2008/0177424 A1 | 7/2008 | Wheeler |
| 2008/0201479 A1 | 8/2008 | Husain |
| 2008/0250415 A1 | 10/2008 | Illikkal et al. |
| 2008/0271038 A1 | 10/2008 | Rolia et al. |
| 2008/0295096 A1 | 11/2008 | Beaty et al. |
| 2009/0113422 A1 | 4/2009 | Kani |
| 2009/0133018 A1 | 5/2009 | Kaneki |
| 2009/0288092 A1 | 11/2009 | Yamaoka |
| 2010/0058349 A1 | 3/2010 | Diwakar et al. |
| 2010/0262964 A1* | 10/2010 | Uyeda et al. ........................ 718/1 |
| 2010/0269109 A1* | 10/2010 | Cartales ............................ 718/1 |
| 2013/0054813 A1* | 2/2013 | Bercovici et al. ............. 709/226 |
| 2013/0174145 A1* | 7/2013 | Chen et al. ......................... 718/1 |

OTHER PUBLICATIONS

International Preliminary Report on Patentability on PCT/US2010/031221 dated Oct. 18, 2011 (CTX-496PC).

(Continued)

*Primary Examiner* — Tammy Lee
(74) *Attorney, Agent, or Firm* — Banner & Witcoff, Ltd.

(57) ABSTRACT

Methods and systems for improved management of power utilization and resource consumption among physical hosts in a cloud computing environment. The management server may provide functionality facilitating the identification and optimized placement of a virtual machine within a cloud computing environment by evaluating historical and heuristic metrics data associated with both the physical hosts and the virtual machines. The management server utilizes the metrics data to generate scores for a plurality of physical host based on physical resources available in a cloud of computing resources. The management server identifies a physical host on which to place a virtual machine using the metrics data, generated scores, and numerous, configurable criteria. The management server responds to the identification of the physical host on which to place a virtual machine by adjusting processor performance and/or operating states for one or more of the physical hosts in the cloud computing environment.

21 Claims, 9 Drawing Sheets

(56) References Cited

OTHER PUBLICATIONS

International Search Report on PCT/US2010/031221 dated Oct. 8, 2010 (CTX-496PC).
Written Opinion on PCT/US2010/031221 dated Oct. 8, 2010 (CTX-496PC).
Qasim Ali, Host Power Management in VMware vSphere 5 Performance Study Technical White Paper, © 2010 VMware, Inc., 10 pages.
Brian Donegan, Deane Smith, CiTRIX® XenServer, Project Possum—Enhanced XenServer-Workload Balancing Power Management—Engine, 2012, 4 pages.

* cited by examiner

METHODS AND SYSTEMS FOR EVALUATING HISTORICAL METRICS IN SELECTING A PHYSICAL HOST FOR EXECUTION OF A VIRTUAL MACHINE

FIELD

This application generally relates to computer networking and computer virtualization. More particularly, aspects described herein provide methods and systems for managing and executing virtual machines within a cloud computing environment. In particular, aspects relate to methods and systems for dynamically managing power and resource consumption by evaluating historical metrics and redistributing virtual machines among physical hosts within a cloud computing environment.

BACKGROUND

Traditionally, personal computers included operating systems, applications, and user settings for a single user. However, many organizations are now using clouds of computing resources to fulfill their computing needs. The clouds of computing resources generally allow for the operating systems, applications, and user settings of multiple users to be included on a single physical machine. Desktop virtualization technology allows multiple instances of a guest operating system to be kept separate within a normal host operating system, so the activities of one user may not affect the experience of other users. Typically methods for managing the power consumption and heat generation of physical host, include consolidating several virtual machines onto a minimal number of physical host allowing inactive or unoccupied hosts to be powered-down until increased resource consumption requires the host to be powered back on. Typically, however, powering on and off physical hosts can be time consuming, and such delay can lead to the customer experiencing poor performance during periods of rapidly increasing resource demand. Moreover, traditional methods of physical host power management have been limited to managing physical resources available in a shared pool of computing resources. Lacking the ability to implement power/heat reduction techniques and evaluate status metrics for physical resources within a cloud computing environment limits, or in some instances, inhibits an administrator's ability to identify a physical host for executing a virtual machine that will optimize power performance.

BRIEF SUMMARY OF THE INVENTION

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

According to one aspect of the disclosure, a method for dynamically managing power consumption of a physical host within a cloud computing environment includes retrieving a first plurality of metrics for each of a plurality of physical hosts available for executing a virtual machine, said first plurality of metrics including at least a first metric identifying a level of usage for each of the plurality of physical hosts as of a predetermined time period. The method includes retrieving a second plurality of metrics associated with the virtual machine, said second plurality of metrics including at least one metric identifying a level of usage exerted on each of the plurality of physical hosts by the virtual machine as of a predetermined time period. The method includes assigning a first power score to each of the plurality of physical hosts responsive to the retrieved first and second pluralities of metrics. The method includes determining a second power score, for each of the plurality of physical hosts, associated with at least the one metric identifying a level of usage exerted on each of the plurality of physical hosts by the virtual machine as of a predetermined time period. The method includes identifying one of the plurality of physical hosts on which to execute the virtual machine wherein the second power score of said physical host satisfies at least one predetermined criteria. The method includes responding to the identification of the physical host on which to execute the virtual machine by adjusting processor performance states for one or more of the plurality of physical hosts, and adjusting processor operating states for one or more of the plurality of physical hosts.

In one embodiment, the method includes retrieving the plurality of metrics for each of a plurality of physical hosts available for executing the virtual machine, said plurality of metrics including at least a second metric identifying a level of usage for each of the plurality of physical hosts during a time period prior to the predetermined time period. In another embodiment the method includes identifying a first physical host in the plurality of hosts for execution of the virtual machine, said first physical host having a higher second power score than a second physical host in the plurality of physical hosts. In still another embodiment, the method includes identifying a first physical host in the plurality of hosts for execution of the virtual machine, said first physical host including a characteristic for maximizing the power efficiency of the virtual machine. In still even another embodiment, the method includes identifying one of the plurality of physical hosts on which to execute the virtual machine by evaluating the location of said physical host to determine maximum power usage efficiency. In yet another embodiment, the method includes applying an algorithm to assign a first power score responsive to the retrieved first and second pluralities of metrics, wherein a variety of weights are applied to the retrieved first and second pluralities of metrics. In another embodiment, the method includes assigning a power score to each of the plurality of physical hosts responsive to the retrieved first and second pluralities of metrics, the retrieved first plurality of metrics including at least a second metric identifying thermodynamic information associated with each of the plurality of physical hosts. In some embodiments, the method includes assigning a power score to each of the plurality of physical hosts responsive to the retrieved first and second pluralities of metrics, said retrieved first plurality of metrics including at least a second metric identifying run-state information associated with each of the plurality of physical hosts. In other embodiments, the method includes responding to the identification of the physical host on which to execute the virtual machine by adjusting the processor operating states of one or more of the plurality of physical hosts in accordance with one or more optimization preferences.

In another aspect of the disclosure, a system for dynamically managing power consumption of a physical host within a cloud computing environment includes a management server, a host recommendation service, and an analysis engine. The management server requests an identification of a physical host on which to execute a virtual machine. The host recommendation service, executing on the management server, receives the request for the identification of the physical host. The analysis engine, executing on the management server, receives from the host recommendation service the request for the identification of a physical host on which to execute the virtual machine. The analysis engine retrieves a first plurality of metrics including a first metric identifying a level of usage on each of a plurality of physical hosts as of a predetermined time period. The analysis engine retrieves a second plurality of metrics associated with the virtual machine, the second plurality of metrics including at least one metric identifying a level of usage exerted on a physical host by the virtual machine as of a predetermined time period. The analysis engine assigns a first power score to each of the plurality of physical hosts responsive to the retrieved first and second pluralities of metrics. The analysis engine determines a second power score, for each of the plurality of physical hosts, associated with at least the one metric identifying a level of usage exerted on each of the plurality of physical hosts by the virtual machine as of a predetermined time period. The host recommendation service identifies one of the plurality of physical hosts on which to execute the virtual machine wherein the second power score of said physical host satisfies at least one predetermined criteria. The management server responds to the identification of the physical host on which to execute the virtual machine by adjusting processor performance states for one or more of the plurality of physical hosts; and adjusting processor operating states for one or more of the plurality of physical hosts.

In one embodiment, the management server includes a customization interface for configuring one or more optimization preferences. In another embodiment, the management server includes a customization interface configuring one or more weights to apply to the retrieved first and second pluralities of metrics. In yet another embodiment, the host recommendation service is further configured to identify one of the plurality of physical hosts on which to execute the virtual machine by evaluating a topographic location of said physical host. In still another embodiment, the host recommendation service is further configured to identify a first physical host in the plurality of hosts for execution of the virtual machine, said first physical host having a higher second power score than a second physical host in the plurality of physical hosts. In some embodiments, the analysis engine is further configured to assign the first power score to each of the plurality of physical hosts, said retrieved first plurality of metrics including at least a second metric identifying thermodynamic information associated with each of the plurality of physical hosts. In other embodiments, analysis engine is further configured to assign the first power score to each of the plurality of physical hosts, said retrieved first plurality of metrics including at least a second metric identifying run-state information associated with each of the plurality of physical hosts. In yet another embodiment, the management server is further configured to respond to the identification of the physical host on which to execute the virtual machine by adjusting the processor operating states of one or more of the plurality of physical hosts in accordance with one or more optimization preferences. In still another embodiment, a metrics acquisition service generates the plurality of metrics for each of the plurality of physical hosts. In some embodiments, the metrics acquisition service queries at least one of the plurality of physical hosts for an identification of a level of usage.

BRIEF DESCRIPTION OF THE DRAWINGS

All descriptions are exemplary and explanatory only and are not intended to restrict the invention, as claimed. The accompanying drawings, which are incorporated in and constitute a part of this specification, illustrate embodiments of the invention and, together with the description, serve to explain the principles of the invention. In the drawings:

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
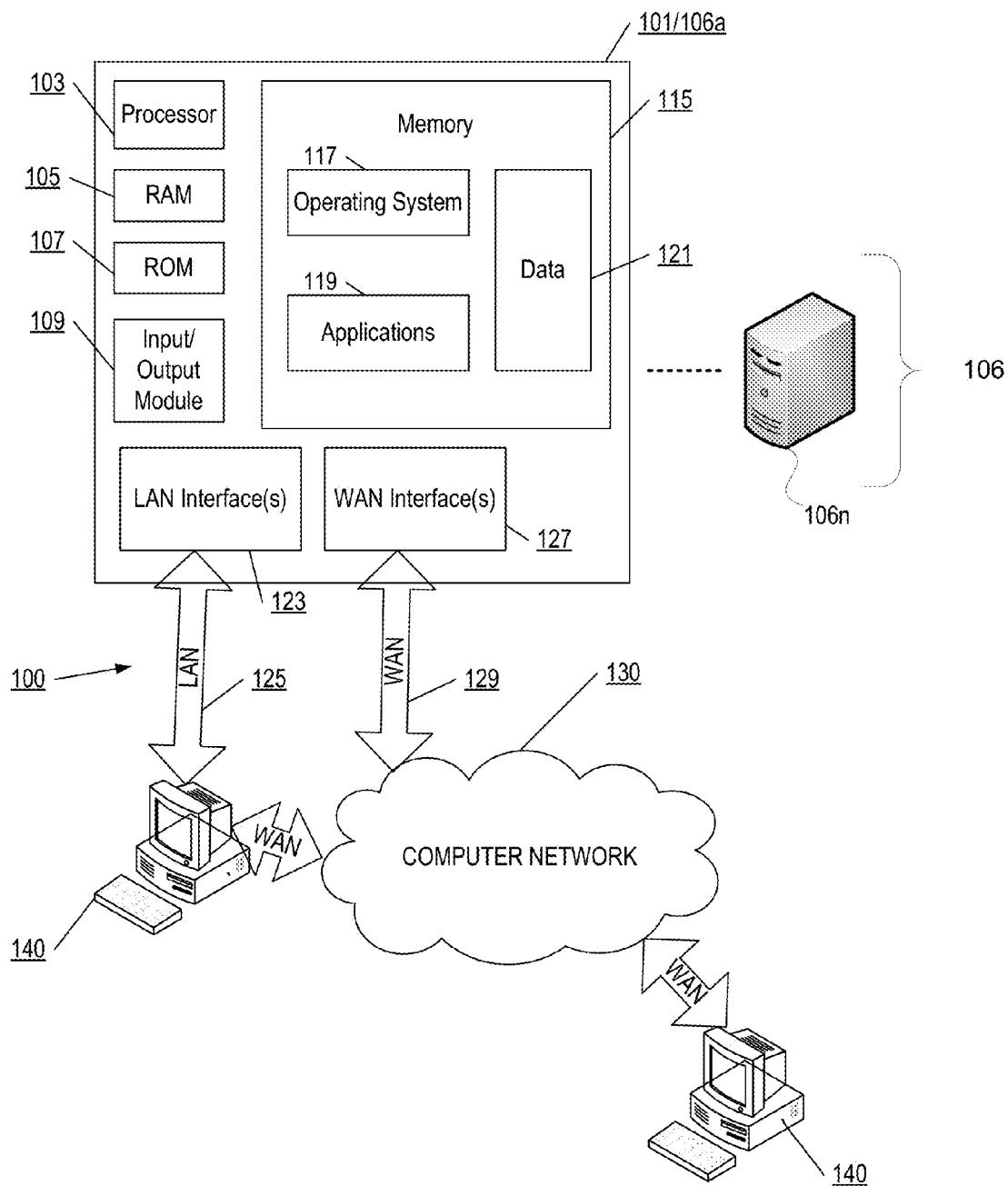
FIG. 1 illustrates an example operating environment in which various aspects of the disclosure may be implemented.

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
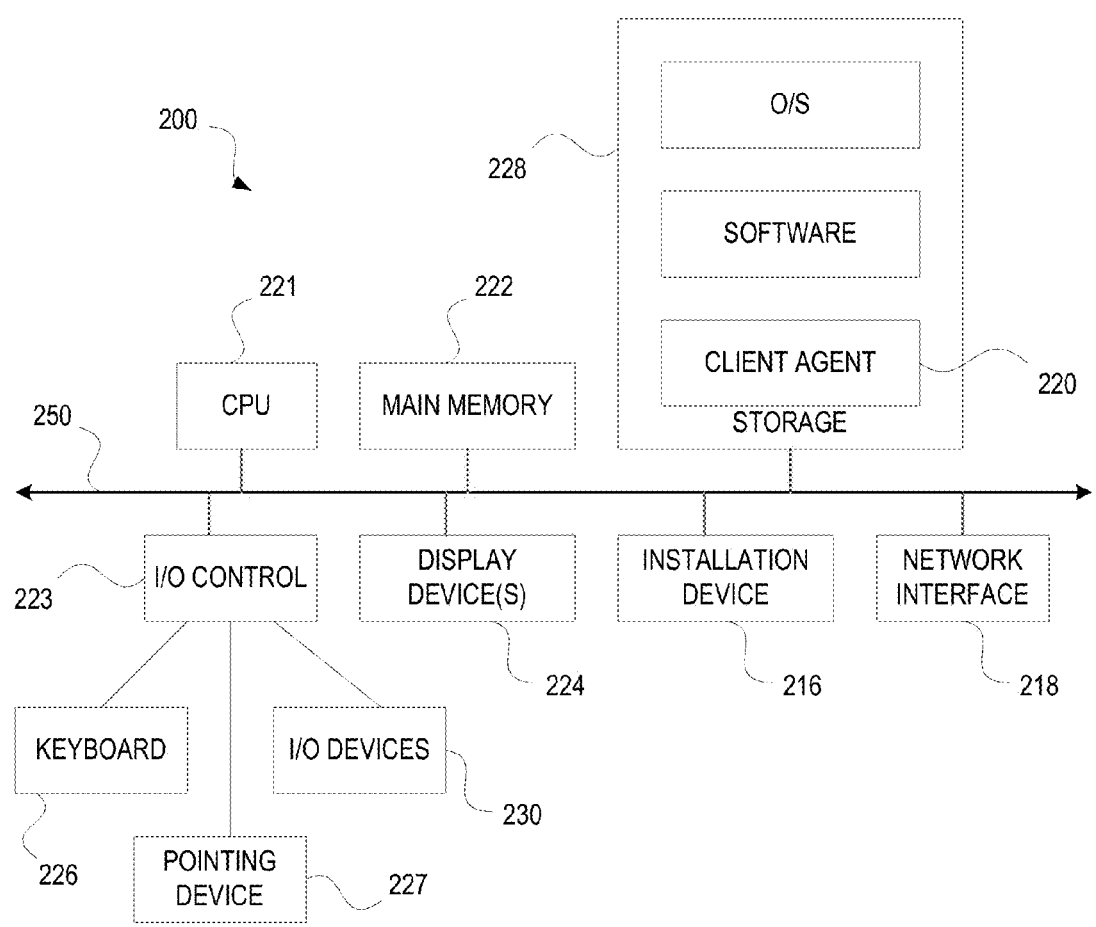
FIG. 2 illustrates a computing device that may be used in accordance with one or more illustrative aspects described herein.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 may include, without limitation: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

Figure 3:
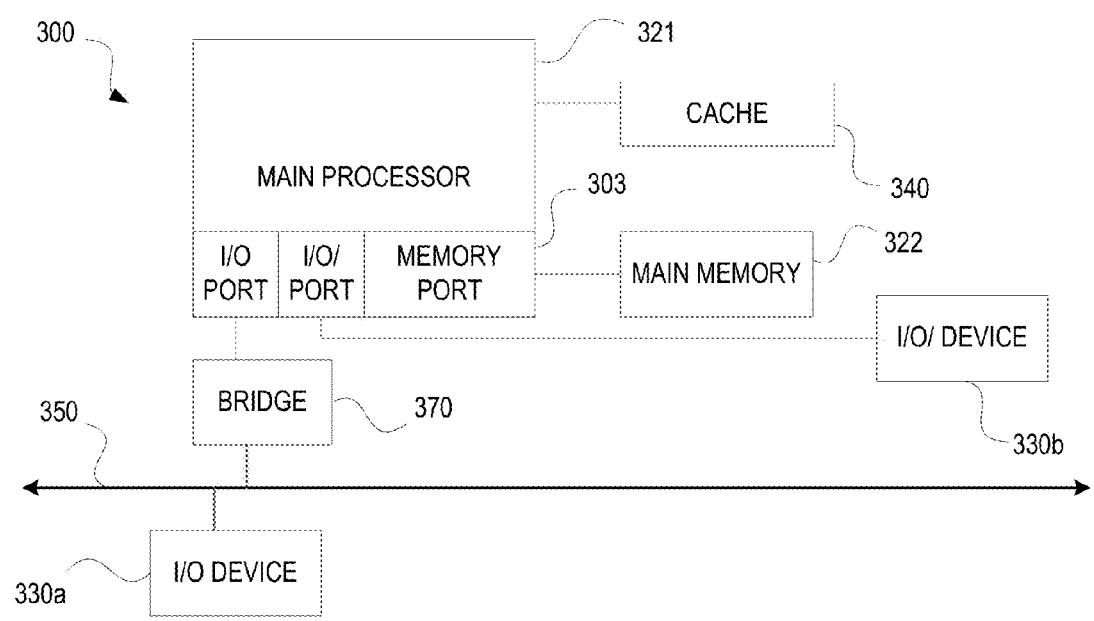
FIG. 3 illustrates a computing device that may be used in accordance with one or more illustrative aspects described herein.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 8100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 4:
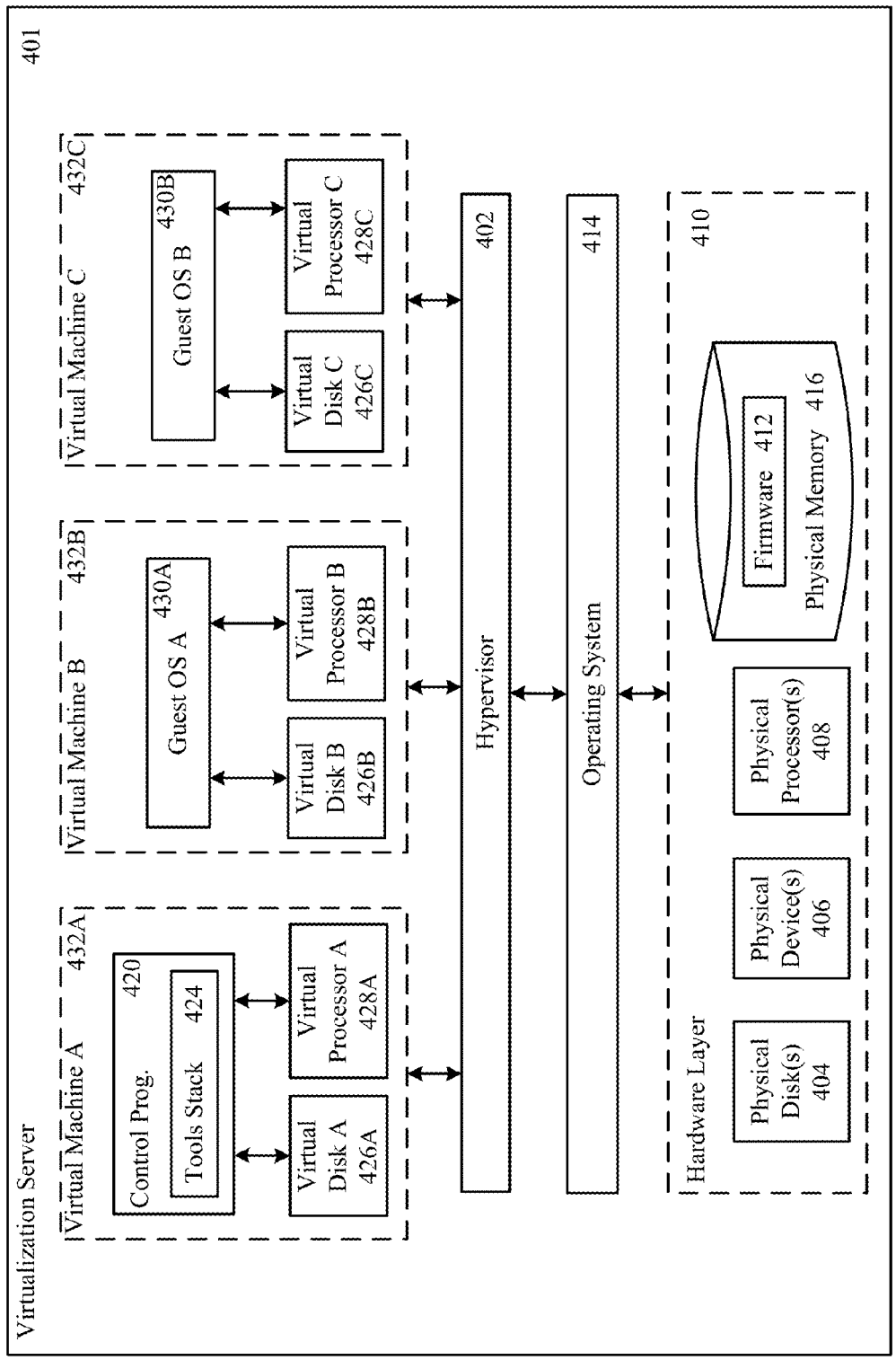
FIG. 4 is a block diagram that depicts embodiments of a virtualization server in accordance with one or more illustrative aspects described herein.

Illustrated in FIG. 4 is one embodiment of a computer device 401 configured as a virtualization server in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can executed, on a virtual processor 428B-C, a guest operating system 430A-B.

Further referring to FIG. 4, and in more detail, the virtualization server 401 may include a hardware layer 410 with one or more pieces of hardware. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401. The physical processor 408 may be configured to operate in accordance with the Advanced Configuration and Power Interface (ACPI) specification, which provides a standard for device configuration and power management. The ACPI specification defines various states as levels of power usage and/or features availability. For example, ACPI states include, but are not limited to, processor operating states (C-States) and processor performance states (P-States).

Virtualization server 401 may also include a hypervisor 402. In some embodiments, hypervisor 402 may be a program executed by processors 408 of the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. Thus, a host operating system 414 may not be present. A Type 1 hypervisor may execute directly on one or more physical processors of 408 the virtualization server 401, and may include program data stored in the physical memory 416. In many embodiments, the hypervisor 402 allocates and manages access to a number of physical resources in the hardware layer 410 (e.g., the processor(s) 408, and disk(s) 404) by at least one virtual machine executing on the virtualization server 401.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks; physical processors; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The control program 420 may execute at least one application for managing and configuring the guest operating systems. In one embodiment, the control program 420 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 402 executes the control program 420 within a virtual machine 432 created by the hypervisor 402. In still another embodiment, the control operating system 420 executes in a virtual machine 432 that is authorized to directly access physical resources on the virtualization server 401.

In one embodiment, the control program 420 executes in a virtual machine 432 that is authorized to interact with at least one guest operating system 430. In another embodiment, a guest operating system 430 communicates with the control program 420 via the hypervisor 402 in order to request access to a disk or a network. In still another embodiment, the guest operating system 430 and the control program 420 may communicate via a communication channel established by the hypervisor 402, such as, for example, via a plurality of shared memory pages made available by the hypervisor 402.

In some embodiments, the control program 420 includes a network back-end driver for communicating directly with networking hardware provided by the virtualization server 401. In one of these embodiments, the network back-end driver processes at least one virtual machine request from at least one guest operating system 430. In other embodiments, the control program 420 includes a block back-end driver for communicating with a storage element on the virtualization server 401. In one of these embodiments, the block back-end driver reads and writes data from the storage element based upon at least one request received from a guest operating system 430.

In one embodiment, the control program 420 includes a tools stack 424 that provides functionality for interacting with the hypervisor 402, or managing virtual machines 432B, 432C on the virtualization server 401. In another embodiment, the tools stack 424 includes customized applications for providing improved management functionality to an administrator of a virtual machine farm. In yet another embodiment, the tools stack 424 may receive requests from a management server to access or manage computing resources for a plurality of virtual machines 432 running on a virtualization server 401. In some embodiments, at least one of the tools stack 424 and the control program 420 include a management API that provides an interface for remotely configuring and controlling virtual machines 432 running on a virtualization server 401. In other embodiments, the control program 420 communicates with the hypervisor 402 through the tools stack 424.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may executes a guest operating system 430 within the virtual machine 432. In still other embodiments, the virtual machine 432 may execute the guest operating system 430. In another embodiment, the guest operating system 430 provides a user of the virtualization server 401 with access to resources within a computing environment. In still another embodiment, a resource includes a program, an application, a document, a file, a plurality of applications, a plurality of files, an executable program file, a desktop environment, a computing environment, or other resource made available to a user of the virtualization server 401. In yet another embodiment, the resource may be delivered to the virtualization server 401 via a plurality of access methods including, but not limited to, conventional installation directly on the virtualization server 401, delivery to the virtualization server 401 via a method for application streaming, delivery to the virtualization server 401 of output data generated by an execution of the resource on a second virtualization server 401' (not shown) and communicated to the virtualization server 401 via a presentation layer protocol, delivery to the virtualization server 401 of output data generated by an execution of the resource via a virtual machine executing on a second virtualization server 401', or execution from a removable storage device connected to the virtualization server 401, such as a USB device, or via a virtual machine executing on the virtualization server 401 and generating output data. In some embodiments, the virtualization server 401 transmits output data generated by the execution of the resource to another virtualization server 401' in a virtualization environment.

In another embodiment, the guest operating system 430, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 420, as described above. In one embodiment, the guest operating system 430, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 402; in such an embodiment, the driver is typically aware that it executes within a virtualized environment.

In addition to creating virtual machines 432, the hypervisor 402 may control the execution of at least one virtual machine 432. In other embodiments, the hypervisor 402 may presents at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

Figure 5:
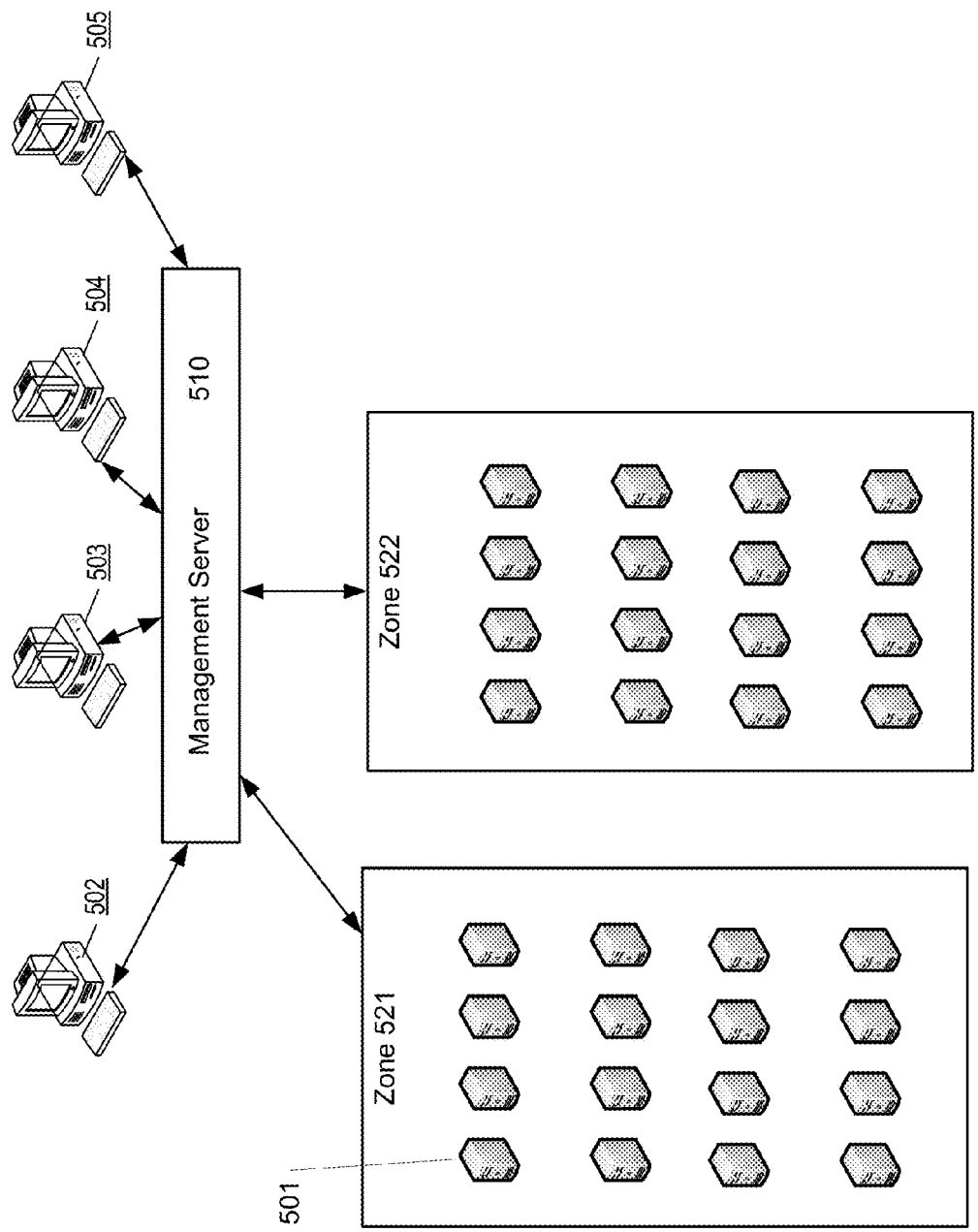
FIG. 5 illustrates an example of a cloud computing environment.

FIG. 5 illustrates an example of a cloud computing environment. As seen in FIG. 5, client computers 502-505 may communicate with management server 510. Management server 510 may be implemented on one or more than one physical server. Client computers 502-505 may connect to management server 510 via the Internet. In some environments, access to management server 510 may be restricted to only client computers on one or more networks.

A user of a client computer may, for example, request access to one or more of the computing resources managed by management server 510. Management server 510 may run, for example, CLOUDSTACK by Citrix Systems, Inc. of Ft. Lauderdale, Fla., or OPENSTACK. Management server 510 may manage computing resources such as host computers, data storage devices, and networking devices, such as firewalls, network address translators, load balancers, virtual private network (VPN) gateways, Dynamic Host Configuration Protocol (DHCP) routers, and the like.

A user of a client computer may request access to one of the computing resources managed by management server 510, such as host computer 501. A host computer may be, for example, a virtualization server capable of running one or more virtual machines. A user of a client computer may request, for example, access to an existing virtual machine or that a virtual machine be created or destroyed. The physical resources selected to fulfill a user request may be governed by management server 510. However, in some embodiments the user may identify a specific host or request that virtual resources be created within a specific group of hosts. A management server may allocate resources in the group requested, or it may allocate resources in a different group of hosts to, for example, avoid overloading a physical computing resource. The management server then sends the appropriate commands to the selected resource. For example, the management server may command a host or other resource to create, start, stop, or delete a virtual machine; to create, alter, or remove virtual disks; to create, alter, or remove virtual network interfaces, etc. These commands may include additional details. For example, a command to create a virtual machine may specify the amount of memory and processing resources it will have available to it, the software that will be included on it, the virtual and/or physical disk(s) it will have access to, etc.

In a computing cloud, such as the one managed by management server 510, a zone may refer to a collocated set of physical computing resources. Each zone may be geographically dispersed from each other zone. For example, zone 521 may be located in California, and zone 522 may be located in Maryland. Management sever 510 may be located in a third zone (not shown). Each zone may include an internal network that interfaces with devices that are outside of the zone, such as management server 510, through a gateway. Users of the computing cloud may be aware of the distinctions between zones, but they are not necessarily aware of the distinctions. For example, a user may simply request that a virtual machine having a set amount of memory and processing power be allocated. Management server 510 may present a user with a customization interface 601, such as the one illustrated in FIG. 6. Alternatively, a user may be able to request that a virtual machine (or other resource) be allocated in a specific zone or subset of a zone.

The cloud illustrated in FIG. 5 allows management server 510 to perform all of the administrative tasks for the resources under its control. By providing a single interface for managing the resources of the cloud, cloud users may achieve both improved scalability and reduced maintenance compared to managing resources individually or managing groups of resources, such as zone 521 or 522, individually. The interface provided by management server 510 may be a graphical user interface 601, such as the one illustrated in FIG. 6. Other examples of interfaces that may be provided by management server 510 include text-based user interfaces and application programming interfaces (APIs). The interface of management server 510 may be public, thereby allowing anyone to make requests of the management server.

The users of a cloud may be unrelated, for example, users may be affiliated with different companies, and the information on the virtual machines or storage of any one user may be hidden from any other user. By sharing a single management server (or set of servers), these users may further reduce maintenance costs by effectively sharing the burden of running management server 510 and the resources it controls.

Some cloud users may wish to have their computing tasks performed on physical resources that the user controls instead of on the physical resources provided by a cloud operator. This may be due to, for example, a concern that data on a physical resource of the cloud operator may be compromised and made available to another cloud user. A cloud user may also wish to perform computing tasks on its own physical resources because those resources may be located nearer to the rest of the user's network, thereby enabling faster connections, lower latency, etc. Finally, a cloud user may wish to use its own physical resources because it can provide the resources at a lower cost than accessing equivalent resources from the cloud operator.

A cloud user desiring to have computing tasks performed on its own physical resources may still take advantage of the improved scalability and reduced maintenance of sharing management server 510. The cloud user can achieve these advantages, by adding its physical resources to the pool of resources managed by management server 510.

Figure 7:
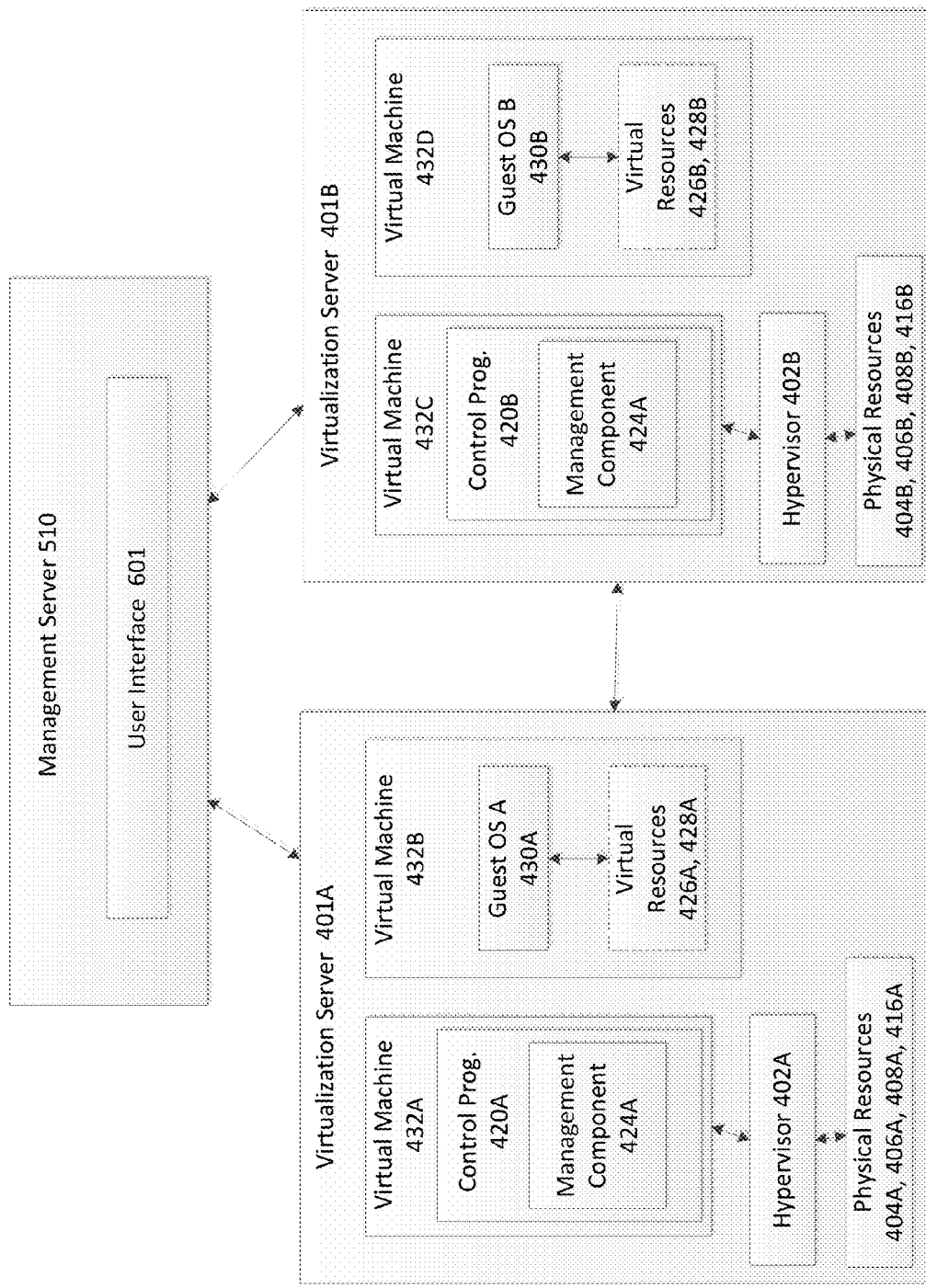
FIG. 7 is a block diagram that depicts an embodiment of a plurality of virtualization servers within a cloud computing environment in a system in which at least one physical host executes a virtual machine.

Referring now to FIG. 7, a block diagram depicts one embodiment of a cloud of computing devices in a system in which at least one physical host executes a virtual machine. In brief overview, the system includes a management server 510, a management component 424 and a hypervisor 402. The system includes a plurality of virtualization servers 401, a plurality of virtual machines 432, a plurality of hypervisors 402, a plurality of management components referred to as tools stacks 424, and several physical resources. The plurality of virtualization servers 401 may each be provided as computing devices 200 and 300, described above in connection with FIGS. 2 and 3.

Referring still to FIG. 7, and in greater detail, a physical disk 404 is provided by a computing device 401 and stores at least a portion of a virtual disk 426. In some embodiments, a virtual disk 426 is associated with a plurality of physical disks 426. In one of these embodiments, and also as described above in connection with FIGS. 1-4, one or more virtualization servers 401 may exchange data with a management server 510 regarding processors and other physical resources available in a cloud computing environment, allowing a hypervisor 402 to manage a plurality of resources distributed across a plurality of physical computing devices within the cloud computing environment. In another embodiment, one or more virtualization servers 401 may exchange data with one or more of the other virtualization servers 401 regarding processors and other physical resources available in a cloud computing environment, allowing a hypervisor 402 to manage a plurality of resources distributed across a plurality of physical computing devices within the cloud computing environment. In some embodiments, a virtualization server 401 on which a virtual machine 432 executes is referred to as a physical host 401 or as a host machine 401.

In one embodiment, the management component 424a is referred to as a cloud management component 424a. In another embodiment, a management operating system 420a, which may be referred to as a control program 420a, includes the management component. In some embodiments, the management component is referred to as a tools stack. In one of these embodiments, the management component is the tools stack 424 described above in connection with FIG. 4. In some embodiments management server 510 provides a user interface 601 for receiving, from a user such as an administrator, an identification of a virtual machine 432 to provision and/or execute. In still other embodiments, management server 510 provides a user interface 601 for receiving, from a user such as an administrator, the request for migration of a virtual machine 432b from one virtualization server 401 to another. In another embodiment, management component 424 will communicate with management server 510 to identify a virtualization sever 401b on which to execute a requested virtual machine 432d and instructs hypervisor 402b on the identified virtualization server 401b to execute the identified virtual machine; such a management component may be referred to as a cloud management component.

Figure 8:
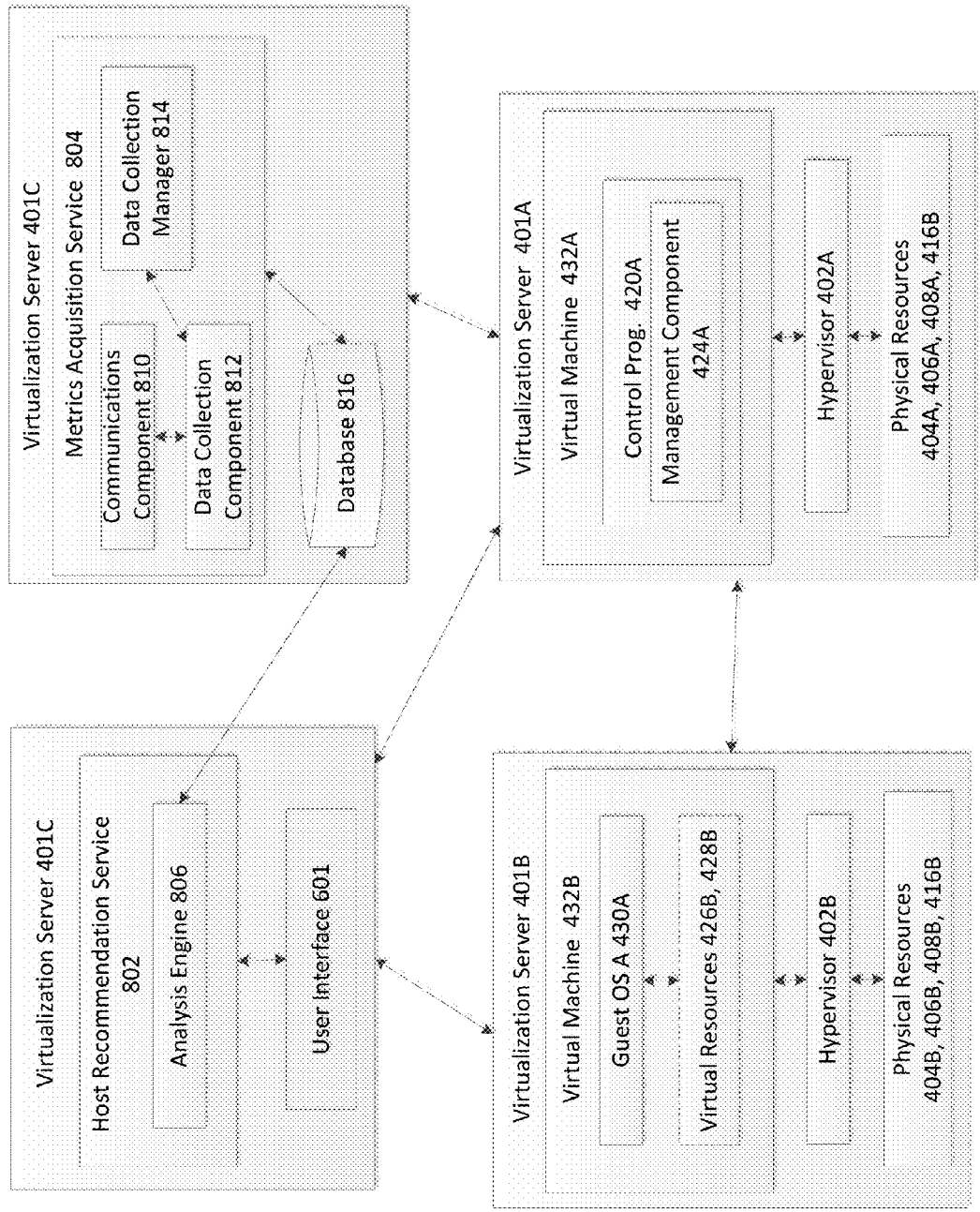
FIG. 8 is a block diagram depicting an embodiment of a system for dynamically managing power consumption of a physical host by evaluating historical metrics in selecting a physical host for execution of a virtual machine within a cloud computing environment.

FIG. 8 depicts a block diagram of one embodiment of a system for dynamically managing power consumption of a physical host within a cloud computing environment. FIG. 8 depicts a similar cloud computing environment as FIG. 5, but provides a more detailed illustration of particular computing devices within that environment. In brief overview, the system includes a management server 510, a plurality of computing devices configured as virtualization servers 401, a plurality of virtual machines 432, a host recommendation service 802, and an analysis engine 806. Management server 510 sends a request for an identification of a physical host 401 on which to execute a virtual machine 432. Host recommendation service 802 executes on management server 510 and receives the request for the identification of physical host 401. Analysis engine 806 executes on the management server 510 and receives, from host recommendation service 802, the request for the identification of physical host 401. Analysis engine 806 retrieves a first plurality of metrics including at least a first metric identifying a level of usage for each of a plurality of physical hosts as of a predetermined time period. Analysis engine 806 retrieves a second plurality of metrics associated with the virtual machine, the plurality of metrics including at least one metric identifying a level of usage exerted on a physical host by the virtual machine as of a predetermined time period. Analysis engine 806 a first power score to each of the plurality of physical hosts responsive to the retrieved first and second pluralities of metrics. Analysis engine 806 determines a second power score, for each of the plurality of physical hosts, associated with at least the one metric identifying a level of usage exerted on each of the plurality of physical hosts by the virtual machine as of a predetermined time period. Host recommendation service 802 identifies one of the plurality of physical hosts on which to execute the virtual machine wherein the second power score of said physical host satisfies at least one predetermined criteria. Management server 510 responds to the identification of the physical host on which to execute the virtual machine by adjusting processor performance states for one or more of the plurality of physical hosts and by adjusting processor operating states for one or more of the plurality of physical hosts.

In some embodiments, host recommendation service 802 and analysis engine 806 execute on a first computing device 401B; and cloud management component 424A executing on a second computing device 401A, receives a request from a management server 510 for an identification of a physical host on which to execute a virtual machine 432. In one of these embodiments, cloud management component 424A communicates with host recommendation service 802 to identify a physical host on which to execute a virtual machine 432. In another of these embodiments, host recommendation service 802 transmits a request for the identification of a physical host, sent by the cloud management component 424A, to an analysis engine 806, which evaluates present and historical metrics identifying levels of usage on physical hosts (e.g., computing devices 401) that are available to execute virtual machine 432 and applies an algorithm to the evaluated metrics to identify an optimal physical host 401 for executing virtual machine 432. In yet another of these embodiments, the host recommendation service 802 includes functionality allowing users to identify what characteristics to optimize. For example, whether to optimize for maximum power performance of a virtual machine or to optimize for maximum density of virtual machines on physical hosts. In still another of these embodiments, the system includes a metrics acquisition service 804 that provides functionality for collecting performance data from hypervisors, virtual machines, physical hosts, and zones of physical hosts, and generating metrics based upon the performance data for use in identifying an optimal physical host. In still even another of these embodiments, host recommendation service 802 includes functionality for allowing administrators the ability to define which hypervisor hosts will be monitored for performance data. In yet another of these embodiments, host recommendation service 802 includes functionality for generating reports regarding hypervisor and virtual machine performance data. In further embodiments, host recommendation service 802 includes functionality for making recommendations regarding virtual machine placement decisions relative to physical hosts.

Referring again to FIG. 8, and in greater detail, management server 510 requests an identification of a physical host 401 within the cloud computing environment on which to execute a virtual machine 406. In one embodiment, management server 510, which manages power usage and workload on a plurality of physical computing devices in a cloud computing environment, requests an identification of a physical host 401 to which to migrate a virtual machine 432. In another embodiment, management server 510 requests an identification of a physical host 401 on which to provision a virtual machine 432. In some embodiments management server 510 receives a request for execution of a virtual machine 406. In one of these embodiments, management server 510 identifies a virtual machine image associated with requested virtual machine 432. In other embodiments management server 510 transmits a request for execution of a virtual machine to a cloud management component 424A. In yet another embodiment, the management server sends the request for an identification of a physical host on which to execute the virtual machine via a user interface 601, such as an interface providing a user access to administrative functionality over an intranet or the Internet.

Host recommendation service 802 receives the request from the management server 510, for the identification of physical host 401 on which to execute virtual machine 432. In another embodiment, the host recommendation service retrieves an identification of a virtual machine based upon information included in the request sent by management server 510. In other embodiments, host recommendation service 802 receives the request from cloud management component 424A, for the identification of the physical host 401 on which to execute virtual machine 432. In one of these embodiments, the host recommendation service includes a receiver for receiving, from pool management component 424A, a request for an identification of a physical host on which to execute virtual machine 432. In another of these embodiments, the host recommendation service includes a receiver for receiving, from pool management component 424A, a request for an identification of a physical host to which to migrate the virtual machine 106.

In yet another embodiment, host recommendation service 802 executes analysis engine 806 upon receiving a request for identification of the physical host 401 on which to execute virtual machine 432. In some embodiments, for example, host recommendation service 802 may execute on a computing device 401, and communicate with management server 510 to identify a computer device on which to execute a virtual machine 432. In one of these embodiments, host recommendation service 802 may execute as part of a virtual machine management product, such as a lab management program, provisioning software, or other virtualization platform providing management capabilities. In some of these embodiments, the host recommendation service includes a receiver for receiving, from management server 510, a request for an identification of a physical host on which to execute virtual machine 432. In another of these embodiments, the host recommendation service includes a receiver for receiving, from management server 510, a request for an identification of a physical host to which to migrate virtual machine 106. In still another embodiment, host recommendation service 802 communicates with a user interface 601 to receive a request for an identification of a physical host within the cloud computing environment on which to execute virtual machine 432.

Figure 6:
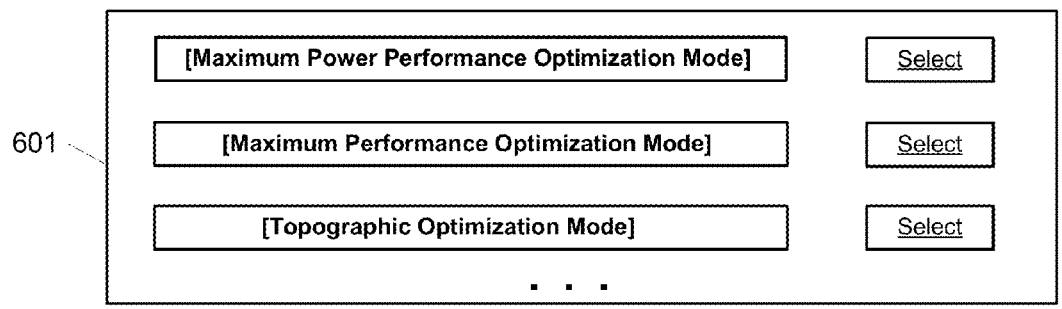
FIG. 6 illustrates an example of a user interface that may be provided by a management server.

In yet another embodiment, host recommendation service 802 communicates with user interface 601 for configuring one or more optimization preferences, as illustrated in FIG. 6. In another embodiment, host recommendation service 802 communicates with a user interface that receives an identification of a customization to an algorithm applied to assign a resource consumption score and power score to each of the plurality of physical hosts. In some embodiments, host recommendation service 802 communicates with a user interface for receiving an identification of a characteristic needed to maximize the available resources of the virtual machine. In still another embodiment, host recommendation service 802 is in communication with a reporting service that provides users with workload distribution and optimization reports; the reporting service may, for example, include, without limitation, functionality for displaying a report in a user interface, transmitting a report via electronic mail, implementing really simple syndication to distribute reports, and providing an application programming interface (API) allowing a user to poll for optimization recommendations and workload reports.

In one embodiment host recommendation service 802, executes the analysis engine 806. In another embodiment, the analysis engine applies an algorithm to generate a first power score assigned to at least one of the plurality of physical hosts. In yet another embodiment, the analysis engine applies an algorithm to generate a resource consumption score assigned to at least one of the plurality of physical hosts. In still another embodiment, analysis engine 806 determines, for each of the plurality of physical hosts, whether a physical host includes a characteristic required for execution of the virtual machine.

In yet another embodiment, analysis engine 806 includes a process that optimizes the power utilization of a physical host. Analysis engine 806 executes on management server 510 and is in communication with host recommendation service 802. In some embodiments, analysis engine 806 is a component of host recommendation service 802. In other embodiments, analysis engine 806 may execute on a first computing device 401A, and communicate with host recommendation service 802 executing on a second computing device 401B. Analysis engine 806 retrieves a plurality of metrics including at least a first metric identifying a level of usage for each of a plurality of physical hosts as of a predetermined time period. Analysis engine 806 retrieves a plurality of metrics associated with the virtual machine, the plurality of metrics including at least one metric identifying a level of usage exerted on a physical host by the virtual machine as of a predetermined time period. In one embodiment, analysis engine 806 includes a database interaction component for accessing a database 816 and retrieving a plurality of metrics from database 816.

In another embodiment, a metrics acquisition service 804 acquires performance data and uses the performance data to generate a plurality of metrics including a first metric identifying a level of usage for each of the plurality of physical hosts as of a predetermined time period. In another embodiment, metrics acquisition service 804 acquires performance data and uses the performance data to generate a plurality of metrics associated with the virtual machine, the plurality of metrics including at least one metric identifying a level of usage exerted on a physical host by the virtual machine as of a predetermined time period. In yet another embodiment, metrics acquisition service 804 stores acquired metrics in a database 816. In another embodiment, the metrics acquisition service 804 stores data in an ODBC-compliant database. For example, database 816 may be provided as an ORACLE database, manufactured by Oracle Corporation of Redwood Shores, Calif.; as a Microsoft ACCESS database or as a Microsoft SQL server database, manufactured by Microsoft Corporation of Redmond, Wash.

In some embodiments, metrics acquisition service 804 queries at least one of the plurality of physical hosts for an identification of a level of usage. In one of these embodiments, the metrics acquisition service 804 generates the plurality of metrics for each of the plurality of physical hosts. In some embodiments, metrics acquisition service 804 includes a communications component 810, a data collection component 812, and a data collection manager 814. In one of these embodiments, communications component 810 provides functionality allowing a data collection component 812 executing on a first computing device to communicate with a second data collection component 812 executing on a second computing device. In another of these embodiments, data collection component 812 on a first computing device in a first zone of computing devices communicates with a second data collection component 812 executing on a second computing device in a second zone of computing devices, as illustrated in FIG. 5 which shows two illustrative zones (521 and 522). In another of these embodiments, the data collection manager 814 identifies a type of hypervisor executing on a computing device 401A in a plurality of computing devices 401. In still another of these embodiments, data collection manager 814 generates a data collection component 812, responsive to the identified type of hypervisor. In one of these embodiments, data collection component 812 communicates with at least one hypervisor to retrieve an identification of performance data for at least one virtual machine executing on a computing device in a cloud of computing devices. In still another of these embodiments, data collection component 812 stores the retrieved performance data in database 816. In yet another of these embodiments, metrics acquisition service 804 executes a plurality of data collection components 812, each of plurality of data collection components 812 communicating with and retrieving performance data from a different type of hypervisor.

In some embodiments, metrics acquisition service 804 is part of host recommendation service 802 executing on management server 510. In other embodiments, metrics acquisition service 804 executes on the same computing device 401 as host recommendation service 802. In yet another embodiment, there may be multiple metrics acquisition services 804 in a network. In another of these embodiments, a computing device 401 on which metrics acquisition service 804 executes may collect performance data as well as also coordinate, via cloud management component 424A, the collection of performance data by data collection components 812 and metrics acquisition services 804 that execute on other physical hosts in the cloud computing environment.

Figure 9:
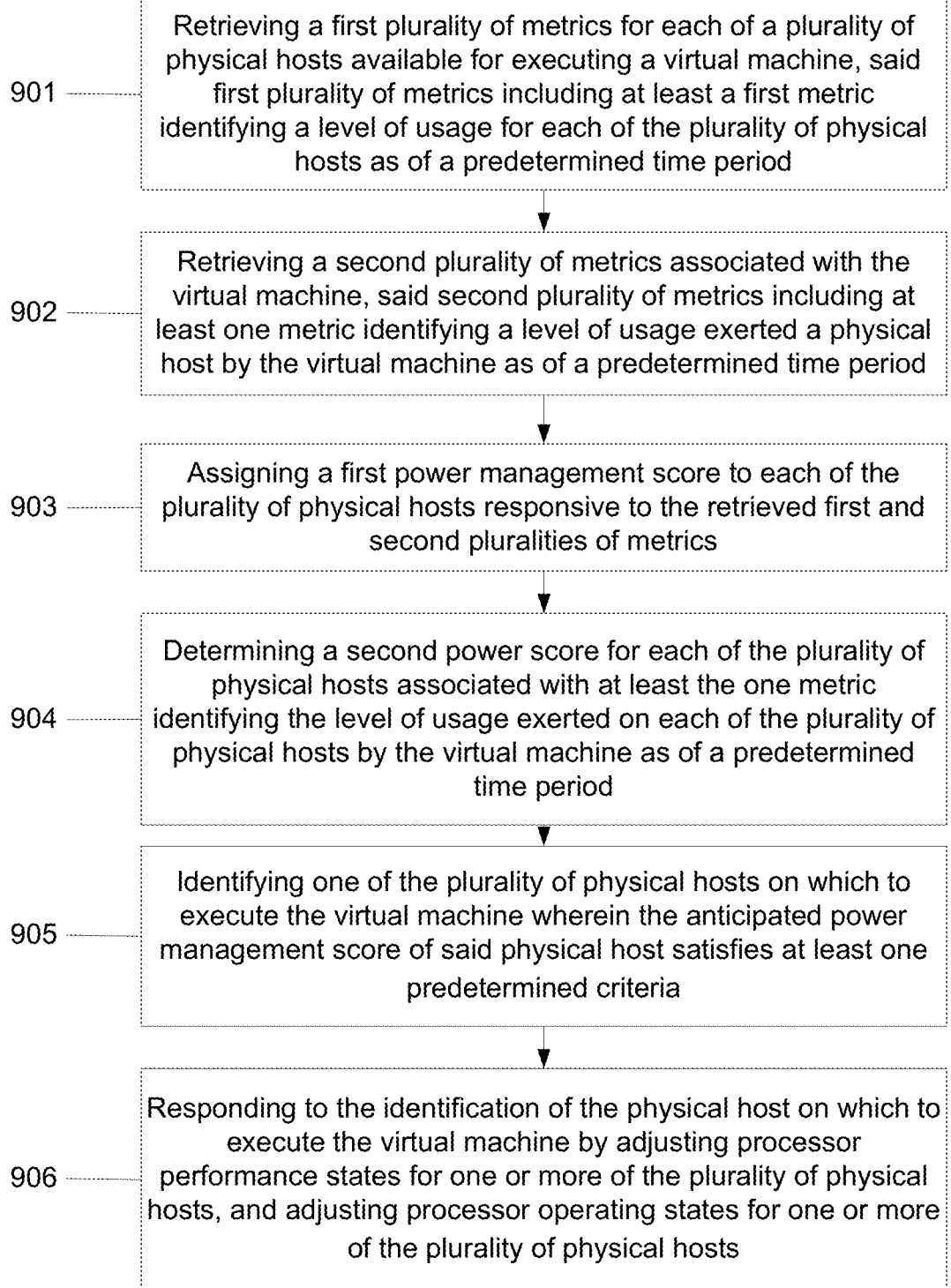
FIG. 9 illustrates a method for dynamically managing power consumption of a physical host by evaluating historical metrics in selecting a physical host for execution of a virtual machine within a cloud computing environment.

FIG. 9 illustrates a method for dynamically managing power consumption of a physical host within a cloud computing environment. In step 901, the analysis engine retrieves a first plurality of metrics for each of a plurality of physical hosts available for executing a virtual machine, said first plurality of metrics including a first metric identifying a level of usage for each of the plurality of physical hosts during a predetermined time period. In one embodiment, analysis engine 806 evaluates the plurality of metrics and assigns one or more scores to a physical host based upon the evaluation. In another embodiment, analysis engine 806 accesses a database 816 to retrieve the plurality of metrics. In some embodiments, multiple physical hosts within the cloud computing environment may be available to execute a virtual machine. In one of these embodiments, an optimal physical host is recommended, for example, by scoring all the potential hosts and recommending the host with the lowest score the score is calculated using metrics data and numerous, configurable criteria.

In some embodiments, analysis engine 806 receives an identification, from host recommendation service 802, of at least one physical host available for executing the identified virtual machine. In one of these embodiments, analysis engine 806 retrieves an identification of a characteristic of the at least one physical host. For example, an identification of a characteristic may include, without limitation, an identification of the power utilization of a host, an identification of a number of central processing units (CPUs), an identification of a processing speed of a CPU, an identification of an amount of memory available on a host, an identification of the level of throughput on the hosting virtualization server, an identification of thermodynamic information associated with the physical host, an identification of the location of the physical host, and an identification of a number of physical network interfaces provide by a host.

In one embodiment, analysis engine 806 retrieves a plurality of metrics including a first metric identifying a level of usage for each of the plurality of physical hosts. In another embodiment, the level of usage may include a level of usage on a resource in a plurality of resources provided by each of a plurality of physical hosts. In still another embodiment, a user may specify a definition for a period of time classified as a predetermined time period. In yet another embodiment, and by way of example, an administrator may configure analysis engine 806 to retrieve a first metric identifying an average level of usage over a five-minute period preceding the receipt of the request on each of the plurality of physical hosts; such a time interval may be referred to as a current time period.

In one embodiment, analysis engine 806 retrieves a plurality of metrics including a second metric identifying a level of usage for each of the plurality of physical hosts during a time period prior to the predetermined time period. In another embodiment, the level of usage may include a level of utilization of a resource in a plurality of resources provided by each of a plurality of physical hosts. In still another embodiment, a user may specify a definition for a period of time classified as a period of time prior to the predetermined time period. In yet another embodiment, and by way of example, an administrator may configure analysis engine 806 to retrieve a second metric identifying an average level of usage over a thirty minute period preceding the ten-minute period prior to receipt of the request on each of the plurality of physical hosts; such a time interval may be referred to as a historical time period, or in another example, an administrator may configure analysis engine 806 to retrieve a second metric identifying an average level of usage over a thirty minute period preceding the five-minute period prior to receipt of the request on each of the plurality of physical hosts; such a time period may be referred to as a recent time period.

In one embodiment, analysis engine 806 retrieves a plurality of metrics including a third metric identifying a level of usage on each of the plurality of physical hosts during a time period prior to the predetermined time period. In another embodiment, analysis engine 806 retrieves a third metric identifying a historical level off usage on each of the plurality of physical hosts. In some embodiments, the analysis engine 806 retrieves a third metric configured to identify an average level of usage over a substantially longer period of time than the second metric. In other embodiments, analysis engine 306 retrieves a third metric configured to identify an average level of usage for a substantially different period of time than the second metric. In still other embodiments, as with the second metric, a user may specify a definition for a period of time classified as a period of time prior to the predetermined time period. In one of these embodiments, and by way of example, an administrator may configure analysis engine 306 to retrieve a third metric identifying an average level of usage over a twenty-four hour period preceding the five-minute period prior to receipt of the request on each of the plurality of physical hosts; such a time interval may be referred to as a historical time period.

In one embodiment, the plurality of metrics includes a metric identifying a threshold for power utilization on a physical computing device. For example, if a computing device has a high or critical level of power utilization during the time period for which analysis engine 806 evaluates the computing device, analysis engine 806 may determine that the computing device cannot execute an additional virtual machine. In another embodiment, the plurality of metrics includes a metric identifying a threshold for utilization of a central processing unit (CPU) on a physical computing device. For example, if a computing device has a high or critical level of CPU utilization during the time period for which analysis engine 806 evaluates the computing device, analysis engine 806 may determine that the computing device cannot execute an additional virtual machine. In yet another embodiment, the plurality of metrics includes a metric identifying thermodynamic information associated with a physical computing device. For example, if a computing device is generating a high or critical level of heat during the time period for which analysis engine 806 evaluates the computing device, analysis engine 806 may determine that the computing device cannot execute an additional virtual machine. In one of these embodiments, analysis engine 806 retrieves one or more plurality of metrics identifying thermodynamic information from software running on the physical host, such as the Data Center Manager (DCM) software manufactured by Intel Corporation. In still another embodiment, the plurality of metrics includes a metric identifying the amount of time the CPU of a physical computing device remains in a particular operational and/or transitional state (which may be referred to as run-state information). For example, if the CPU of a computing device has been in a Ready State for a threshold amount of time prior to the time period for which analysis engine 806 evaluates the computing device, analysis engine 806 may determine that the computing device can execute an additional virtual machine.

In some embodiments, analysis engine 806 evaluates a metric for a first computing device and determines that the first computing device can execute an additional virtual machine but has a level of power utilization associated with a higher power score than a second computing device. For example, the first computing device may have a level of power utilization closer to a threshold (such as a level categorized as medium or high) than the second computing device which may have a lower level of power utilization. In one of these embodiments, analysis engine 806 may assign a different (e.g., higher) power score to the first computing device for that metric. In yet another embodiment, the plurality of metrics includes a metric identifying a threshold for available memory on a physical computing device. For example, if a computing device has a high or critical level of unavailable memory during the time period for which analysis engine 806 evaluates the computing device, analysis engine 806 may determine that the computing device cannot execute an additional virtual machine. In still another embodiment, the plurality of metrics includes a metric identifying a threshold for utilization of network resource by a physical computing device. For example, if a computing device has a high or critical level of network interface utilization during the time period for which analysis engine 806 evaluates the computing device, analysis engine 806 may determine that the computing device cannot execute an additional virtual machine. In yet another embodiment, the plurality of metrics includes a metric identifying a threshold for disk utilization on a physical computing device. For example, if a computing device has a high or critical level of disk utilization during the time period for which analysis engine 806 evaluates the computing device, analysis engine 806 may determine that the computing device cannot execute an additional virtual machine.

In step 902, the analysis engine retrieves a second plurality of metrics associated with the virtual machine, said second plurality of metrics including at least one metric identifying a level of usage exerted on a physical host by the virtual machine during a predetermined time period. In some embodiments, analysis engine 806 accesses a database 816 to retrieve the plurality of metrics. In one embodiment, the plurality of metrics includes a metric identifying a level of power utilization by virtual machine 432. In another embodiment, the plurality of metrics includes a metric identifying a level of utilization of a central processing unit (CPU) by the virtual machine 432. In yet another embodiment, the plurality of metrics includes a metric identifying a level of utilization of memory by virtual machine 432. In still another embodiment, the plurality of metrics includes a metric identifying a level of utilization of a network resource by virtual machine 432. In yet another embodiment, the plurality of metrics includes a metric identifying a level of disk utilization by virtual machine 432. In still another embodiment, the plurality of metrics includes a metric identifying a level of thermal temperature generated by virtual machine 432. In yet another embodiment, the plurality of metrics includes a metric identifying the location of the virtual machine. In some embodiments, the plurality of metrics includes a metric identifying an average amount of resources required by a virtual machine. For example, the metric may identify, without limitation, an average amount of power utilization, average amount of available memory, average amount of disk utilization, average amount of CPU utilization, average amount of network resource utilization, and an average increase in thermal temperature associated with the virtual machine during previous executions of the virtual machine. In some embodiments, analysis engine 806 determines a level of priority associated with at least one of the first metric identifying a level of usage on each of the plurality of physical hosts. In one embodiment, analysis engine 806 accesses a database of data stored by host recommendation service 802 and identifying a level of prioritization to apply to a metric.

In some embodiments, host recommendation service 802 communicates with a user interface 601, which may be configured as a customization interface with which a user, such as an administrator, can configure one or more weights to apply to a plurality of metrics. The user thus has the capability to customize a level of significance attributed to each of the plurality of metrics for a particular physical host. The weights attributed to each of the plurality of metrics for a particular physical host are utilized in determining a score for the physical host when determining whether to identify the physical host as the computing device on which to execute the virtual machine. In one of these embodiments, customization interface 601 provides functionality allowing a user to specify a weight to apply in scoring a metric generated during a predetermined time period. In another of these embodiments, customization interface 601 provides functionality allowing a user to specify a level of priority to assign to a time period during which at least one metric is generated. For example, customization interface 601 may include an interface element allowing a user to specify that metrics generated during a historical time period are to be assigned greater level of priority than metrics generated during a current time period.

In other embodiments, host recommendation service 802 communicates with a customization interface with which a user, such as an administrator, can configure one or more rules to apply in determining a score for a physical host. In one of these embodiments, for example, a rule may specify a quantity of an available resource that a physical host should provide for a virtual machine, including without limitation, a level of available power utilization, memory, disk utilization, or CPU utilization. In other embodiments, host recommendation service 802 communicates with a customization interface with which a user, such as an administrator, can configure one or more optimization preferences. In one of these embodiments, for example, a user may specify that host recommendation service 802 should assign lower scores to physical hosts that provide resources for maximizing power performance of a virtual machine (which may be referred to as a maximum power performance optimization mode). In another of these embodiments, for example, a user may specify that host recommendation service 802 should assign lower scores to physical hosts that provide resources for maximizing performance of a virtual machine (which may be referred to as a maximum performance optimization mode).

In yet another of these embodiments, for example, a user may specify that host recommendation service 802 should assign lower scores to physical hosts residing on virtualization servers with optimal topographic locations that provide resources for maximizing performance of a virtual machine (which may be referred to as a topographical optimization mode). In still another of these embodiments, for example, a user may specify a time period in which host recommendation service 802 should operate according to an optimization mode. In yet another of these embodiments, for example, a user may specify a first time period in which host recommendation service 802 should operate according to a first optimization mode and a second time period in which host recommendation service 802 should operate according to a second optimization mode. In yet another of these embodiments, for example, a user may specify that host recommendation service 802 should assign lower scores to physical hosts that provide resources for a plurality of virtual machines, minimizing the number of total physical hosts required to manage a total workload across a plurality of physical hosts (which may be referred to as a maximum density optimization mode).

In step 903, the analysis engine assigns a first power score to each of the plurality of physical hosts responsive to the retrieved first and second pluralities of metrics. In one embodiment the analysis engine analyzes each of the metrics in the plurality of metrics to assign the first power score for each of the plurality of physical hosts. In some embodiments, the analysis engine assigns a first power score to each of the plurality of physical hosts responsive to the retrieved first and second pluralities of metrics, and to a determined level of priority. In another embodiment the analysis engine analyzes each of the metrics in the plurality of metrics to assign the resource consumption score for each of the plurality of physical hosts. In other embodiments, the analysis engine assigns a resource consumption score to each of the plurality of physical hosts responsive to the retrieved first and second pluralities of metrics, and to a determined level of priority. In another embodiment, for example, in assigning the resource consumption score to the physical host providing a resource, such as disk utilization, analysis engine 806 retrieves data identifying a weight to apply to a level of available resource utilization, such as a level of disk utilization available; analysis engine 806 generates an initial resource consumption score for a physical host based upon an evaluation of a level of availability for a resource provided by the physical host, determines that a weight is associated with the level of availability of the resource, and modifies the initial resource consumption score for the physical host based upon the weight. In one of these embodiments, the resource consumption score is a composite of the weighted initial scores for a plurality of the resources provided by the physical host. In another of these embodiments, the resource consumption score is an average of the weighted initial scores for a plurality of the resources provided by the physical host.

In another embodiment, analysis engine 806 assigns a resource consumption score comprising one or more sub-scores, including scores assigned to, without limitation, a level of power utilization, a level of available CPU utilization, a level of available memory, and a level of available disk utilization, that are responsive to the retrieved pluralities of metrics. In yet another embodiment, a level of available utilization of a resource is adjusted based on an anticipated level of utilization by the virtual machine. For example, an initial level of available disk utilization may be identified as a percentage of total disk utilization available and then reduced by an amount of utilization used by the virtual machine in previous sessions. In some of these embodiments the anticipated level of utilization of a resource is determined in accordance with an amount of utilization used by the virtual machine during a historical time period.

In still another embodiment, for example, in assigning the first power score to a physical host, analysis engine 806 retrieves data identifying a weight to apply to one or more levels of power utilization, such as a level of power consumption, a level of CPU utilization, or a level of thermal temperature; analysis engine 806 generates a maximum first power score for the physical host consuming the most power based upon an evaluation of one or more levels of power utilization for each of the plurality of physical hosts, determines that a weight is associated with one or more levels of power utilization, modifies the maximum first power score for the physical host based upon the weight; and determines the first power score for each of the plurality of physical hosts based upon the maximum first power score. In some embodiments, analysis engine 806 generates the maximum first power score based upon an evaluation of a level of power utilization for each of the plurality of physical hosts located in one or more zones of computing devices. In one of these embodiments, the first power score assigned to each of the plurality of physical hosts is proportional to the maximum first power score. In another of these embodiments, the first power score assigned to each of the plurality of physical hosts may be identified as a percentage of the maximum first power score.

In some embodiments, analysis engine 806 retrieves an identification of an algorithm to apply in identifying a physical host to execute a virtual machine. In one of these embodiments, for example, analysis engine 806 retrieves an identification of an algorithm that generates lower resource consumption scores for potential hosts providing resources for maximizing performance of a virtual machine. In still another of these embodiments, analysis engine 806 retrieves an identification of an algorithm that generates higher resource consumption scores for potential hosts residing on severs with elevated levels of capacity or throughput. In another of these embodiments, analysis engine 806 retrieves an identification of an algorithm that generates lower power scores for potential hosts providing resources for maximizing power performance of a virtual machine. In yet another of these embodiments, analysis engine 806 retrieves an identification of an algorithm that generates lower resource consumption scores for potential hosts capable of executing multiple virtual machines, resulting in maximum density of virtual machines per physical host and a reduced number of physical hosts to manage a total amount of workload.

In step 904, analysis engine determines a second power score, for each of the plurality of physical hosts, associated with at least the one metric identifying the level of usage exerted on each of the plurality of physical hosts by the virtual machine as of a predetermined time period. In one embodiment, analysis engine 806 analyzes one or more anticipated levels of power utilization and a weight assigned to each anticipated level of power utilization generated by a hypothetical migration of virtual machine 432 to one of the plurality of physical hosts; the analysis engine determines a second power score for the physical host based upon an evaluation of the one or more anticipated levels of power utilization generated by the hypothetically-migrated virtual machine; and the analysis engine determines, for each of the plurality of physical hosts, a second power score. In another embodiment, analysis engine 806 determines the second power score based upon the hypothetical migration of the virtual machine to each of a plurality of physical hosts located in the same zone of computing devices. In yet another embodiment, analysis engine 806 determines, for each of the plurality of physical hosts, whether a physical computing device includes a level of available power capacity required for execution of virtual machine 432.

In step 905, host recommendation service 802 identifies one of the plurality of physical hosts on which to execute the virtual machine wherein the second power score of said physical host satisfies at least one predetermined criteria. In one embodiment, host recommendation service 802 identifies a first physical host in the plurality of physical hosts for execution of the virtual machine, the first physical host having a lower second power score than a second physical host in the plurality of physical hosts. In another embodiment host recommendation service 802 identifies a first physical host in the plurality of physical hosts for execution of the virtual machine, the physical host including at least one characteristic needed to maximize the available resources of the virtual machine as identified by a weight associated with a metric maximizing a level of power utilization.

In one embodiment, host recommendation service 802 selects a physical host for execution of the virtual machine such that power utilization is distributed substantially evenly across a plurality of physical computing devices within a cloud computing environment, as illustrated in FIG. 5, in order to maximize the power performance of each virtual machine. In another embodiments, host recommendation service 802 selects a physical host for execution of the virtual machine such that on or more levels of available resources are distributed substantially evenly across a plurality of physical computing devices within a cloud computing environment in order to maximize the performance of each virtual machine. In another embodiment, host recommendation service 802 communicates with a customization interface with which a user, such as an administrator, can select an optimization mode in which host recommendation service 802 should execute. In one of these embodiments, for example, the administrator may configure host recommendation service 802 to prioritize power performance, placing a virtual machine on a physical host that will provide improved power utilization for the virtual machine, or, in another example, the administrator may configure host recommendation service 802 to require each physical host to maintain a threshold level of power utilization efficiency.

In still another embodiment, host recommendation service 802 recommends the migration of a virtual machine from a physical host that exceeds a power utilization threshold to a different physical host in order to optimize distribution of power utilization throughout a zone of physical hosts; host recommendation service 802 may identify the physical host to which to migrate the virtual machine using the methods and systems described above. In some embodiments, host recommendation service 802 recommends the migration of a virtual machine from a physical host that exceeds a resource threshold to a different physical host in order to optimize distribution of one or more resources throughout a zone of physical hosts. In yet another of these embodiments, host recommendation service 802 provides a user with a notification of the exceeded threshold and any migration recommendations identified.

In still another embodiment, host recommendation service 802 recommends a physical host for execution of the virtual machine such that each physical host in the plurality of computing devices hosts as many virtual machines as the physical host has resources to support, in order to minimize the number of physical hosts. In some of these embodiments, in which analysis engine 806 distributes virtual machine workload to as few physical hosts as possible, the scoring process may include computing a scaling factor to allow for a balance between performance and density with extra weights applied towards density. In other of these embodiments, in which analysis engine 806 distributes virtual machine workload to physical hosts able to maximize the performance of each virtual machine, analysis engine 806 may sort a plurality of virtual machines for which it has received requests for identifications of physical hosts, sorting the plurality of virtual machines into an enumerated list that, for example, places virtual machines with lower scores and, therefore, greater requirements for resources than other virtual machines at the beginning of the list. Thus, by identifying a physical host for a virtual machine with a lower score sooner than for a virtual machine with a higher score, analysis engine 806 increases the probability that a physical host with the resources to maximize performance of the virtual machine will be available. In other embodiments, host recommendation service 802 communicates with a customization interface with which a user, such as an administrator, can select a maximum density optimization mode in which host recommendation service 802 identifies a physical host executing a plurality of virtual machines in order to maximize the density of virtual machines per physical host in the plurality of physical hosts.

In some embodiments, host recommendation service 802 identifies a physical host executing a processor with one or more cores. In one of these embodiments, for example, the physical host may be a computing device as described above in connection with FIG. 3. In another of these embodiments, host recommendation service 802 identifies a processor in a plurality of processors on which to execute the virtual machine. In still another of these embodiments, host recommendation service 802 identifies a portion of a multicore processor with which to execute the virtual machine. In yet another of these embodiments, host recommendation service 802 identifies a subset of available processors on a physical host for execution of a virtual machine. In other embodiments, host recommendation service 802 identifies both a physical host and a subset of available processors on a physical host for execution of a virtual machine.

In still other embodiments, host recommendation service 802 receives an identification of a physical host and, implementing the methods described herein, identifies a processor in a plurality of processors on which to execute a virtual machine. In some of these embodiments, host recommendation service 802 identifies a processor for execution of the virtual machine such that workload is distributed substantially evenly across the plurality of processors on which to execute the virtual machine. In some of these embodiments, host recommendation service 802 identifies a processor for execution of the virtual machine in accordance with one or more optimization preferences.

In another embodiment, host recommendation service 802 may optimize the topographical distribution of resources by recommending the migration of a virtual machine to a physical host on a virtualization server having an optimal location. In some embodiments, analysis engine 806 analyzes one or more metrics in a plurality of metrics retrieved from the plurality of available physical hosts to determine an optimal virtualization server location. In one of these embodiments, the plurality of metrics includes a metric identifying a threshold for workload on a physical computing device. For example, if a computing device has a high or critical level of workload during the time period for which analysis engine 806 evaluates the computing device, analysis engine 806 may determine that the computing device cannot execute an additional virtual machine. In another of these embodiments, the plurality of metrics includes a metric identifying a location of the physical computing device. For example, such a location may include without limitation, a zone location, a virtualization server location, or a geographic location.

In yet another embodiment, host recommendation service 802 selects a physical host for execution of the virtual machine such that server workload is distributed substantially evenly across a plurality of available virtualization servers within a cloud computing environment. In some embodiments, host recommendation service 802 recommends the migration of a virtual machine from a physical host residing on a virtualization server that fails to satisfy a threshold level of workload to a different physical host in order to optimize the topographical distribution of resources. For example, if a virtualization server has a high or critical level of workload then host recommendation service 802 will not recommend a physical host residing on that virtualization server to execute an additional virtual machine, or in another example, if a virtualization server has a low or minimal level of workload then host recommendation service 802 will not recommend a physical host residing on that virtualization server to execute an additional virtual machine. In one of these embodiments, host recommendation service 802 may prioritize the migration of a virtual machine residing on a virtualization server that falls below the threshold level of workload to a different virtualization server exceeding the minimum level of workload in order to decrease the number of total physical hosts required to manage a total workload across a plurality of physical hosts in the cloud computing environment.

In still another embodiment, host recommendation service 802 communicates with a customization interface with which a user, such as an administrator, can select a topographic optimization mode in which host recommendation service 802 recommends the migration of a virtual machine from a physical host residing on a virtualization server that fails to satisfy a threshold level of workload to a physical host on a different virtualization server in order to optimize the topographical distribution of workload throughout the cloud computing environment.

In step 906, management server 510 responds to the identification of the physical host on which to execute the virtual machine by adjusting processor performance states for one or more of the plurality of physical hosts, and adjusting processor operating states for one or more of the plurality of physical hosts. In some embodiments management server 510 responds to the identification of the physical host on which to execute the virtual machine by executing the virtual machine on the identified physical host. In another embodiment, management server 510 adjusts the ACPI processor operating state (i.e. C-State) for one or more of the plurality of physical hosts in accordance with one or more metrics retrieved by analysis engine 806. In yet another embodiment, management server 510 adjusts the ACPI processor performance state (i.e. P-State) of one or more of the plurality of physical hosts in accordance with one or more metrics retrieved by analysis engine 806.

In still another embodiment, analysis engine 806 determines, for each of the plurality of physical hosts, whether, for any of the metrics in the retrieved first and second pluralities of metrics, the physical host meets a configured threshold of available resources. For example, analysis engine 806 may determine that a physical host 401 has exceeded a threshold level of power utilization; and management server 510 will adjust the P-State of physical host's processor 408 upward, or, in another example, analysis engine 806 may determine that a physical host 401 has fallen below a threshold level of power utilization, and management server 510 will adjust the P-State of physical host's processor 408 downward. In other embodiments, analysis engine 806 may determine that a physical host 401 has exceeded a threshold level of power utilization; and management server 510 will adjust the C-State of physical host's processor 408 upward into an idle state, or, in another example, analysis engine 806 may determine that a physical host 401 has fallen below a threshold level of power utilization, and management server 510 will adjust the P-State of physical host's processor 408 downward into a ready state. In some embodiments, the physical host's processor may be provided as a processing unit 321 having one or more processor cores as described in connection with FIG. 3. In one of these embodiments, where the physical host exceeds a configured threshold of available resources, management server 510 will adjust the C-State State of physical host's processor 408 to idle on or more processor cores. In another of these embodiments, management server 510 will adjust the C-State of the physical host's processor 408 to shut down on or more processor cores.

In some embodiments, management server 510 responds to the identification of the physical host on which to execute the virtual machine by adjusting the processor operating states of one or more of the plurality of physical hosts in accordance with one or more optimization preferences. In one of these embodiments, where a maximum performance optimization mode has been selected, management server 510 may monitor and adjust the C-State of a physical host's processor 408 more aggressively than the processor P-State. In another of these embodiments, where a maximum density mode has been selected, management server 510 will adjust upward the C-State of a physical host having fallen below a threshold ratio of virtual machines per physical host. In some of these embodiments, the adjusted C-State will cause one or more processors of the physical host to become idle or shut down. In yet other embodiments, management server 510 adjusts the P-state of one or more physical hosts in accordance with a selected optimization mode. In one of these embodiments, where a maximum performance optimization mode has been selected, management server 510 may monitor and adjust the P-State of a physical host's processor 408 more aggressively than the processor C-State. In another of these embodiments, where a maximum density mode has been selected, management server 510 will adjust upward the P-State of a physical host having fallen below a threshold ratio of virtual machines per physical host.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:
1. A method comprising:
retrieving a first plurality of metrics for each of a plurality of physical hosts available for executing a virtual machine, the first plurality of metrics including at least a first metric identifying a level of usage for each of the plurality of physical hosts as of a first predetermined time period;
retrieving a second plurality of metrics associated with the virtual machine, the second plurality of metrics including at least one metric identifying a level of usage exerted on a physical host by the virtual machine as of a second predetermined time period;
assigning a first power score to each of the plurality of physical hosts responsive to the retrieved first and second pluralities of metrics, wherein each first power score is based on the first plurality of metrics and the second plurality of metrics associated with a respective physical host of the plurality of physical hosts;
identifying a particular physical host of the plurality of physical hosts having a highest first power score of the plurality of first power scores, wherein the assigning the plurality of first power scores assigned to the plurality of physical hosts other than the particular physical host is specified in proportion to the highest first power score;
determining a second power score, for each of the plurality of physical hosts, based at least in part on a metric identifying an anticipated level of usage exerted on each of the plurality of physical hosts by the virtual machine as of a third predetermined time period, wherein the metric is from one of the first plurality of metrics or the second plurality of metrics;
identifying a first physical host of the plurality of physical hosts on which to execute the virtual machine, wherein the second power score of said first physical host satisfies at least one predetermined criteria;
responding to the identification of the first physical host on which to execute the virtual machine by:
  i. adjusting processor performance states for one or more of the plurality of physical hosts; and
  ii. adjusting processor operating states for one or more of the plurality of physical hosts.

2. The method of claim 1, wherein the retrieved first plurality of metrics includes at least a second metric identifying a level of usage for each of the plurality of physical hosts during a time period prior to the first predetermined time period.

3. The method of claim 1, wherein the identifying the first physical host of the plurality of physical hosts on which to execute the virtual machine is based on the first physical host having a higher second power score than a second physical host in the plurality of physical hosts.

4. The method of claim 1, wherein the identifying the first physical host of the plurality of hosts on which to execute the virtual machine is based on the first physical host including a characteristic for maximizing a power efficiency of the virtual machine.

5. The method of claim 1, wherein the identifying the first physical host of the plurality of physical hosts on which to execute the virtual machine is based on an evaluation of a topographic location of the first physical host.

6. The method of claim 1, further comprising applying an algorithm to assign the plurality of first power scores, wherein a variety of weights are applied to the retrieved first and second pluralities of metrics.

7. The method of claim 1, wherein the retrieved first plurality of metrics including at least a second metric identifying thermodynamic information associated with each of the plurality of physical hosts.

8. The method of claim 1, wherein the retrieved first plurality of metrics including at least a second metric identifying run-state information associated with each of the plurality of physical hosts.

9. The method of claim 1, further comprising adjusting the processor operating states of one or more of the plurality of physical hosts in accordance with one or more optimization preferences.

10. A system comprising:
a processor;
a management server;
an analysis engine executing on the management server;
memory storing computer executable instructions that, when executed by the processor, cause the analysis engine at least to:
  retrieve a first plurality of metrics for each of a plurality of physical hosts available for executing a virtual machine including a first metric identifying a level of usage on each of the plurality of physical hosts as of a first predetermined time period;
  retrieve a second plurality of metrics associated with the virtual machine, the second plurality of metrics including at least one metric identifying a level of usage exerted on a physical host by the virtual machine as of a second predetermined time period;
  assign a first power score to each of the plurality of physical hosts responsive to the retrieved first and second pluralities of metrics, wherein each first power score is based on the first plurality of metrics and the second plurality of metrics associated with a respective physical host of the plurality of physical hosts;
  identify a particular physical host of the plurality of physical hosts having a highest first power score of the plurality of first power scores, wherein assignment of the plurality of first power scores assigned to the plurality of physical hosts other than the particular physical host is specified in proportion to the highest first power score; and
  determine a second power score, for each of the plurality of physical hosts, based at least in part on a metric identifying an anticipated level of usage exerted on each of the plurality of physical hosts by the virtual machine as of a third predetermined time period, wherein the metric is from one of the first plurality of metrics or the second plurality of metrics;
wherein the computer executable instructions, when executed by the processor, further cause the management server at least to:
  identify a first physical host of the plurality of physical hosts on which to execute the virtual machine, wherein the second power score of the first physical host satisfies at least one predetermined criteria; and
wherein the computer executable instructions, when executed by the processor, further cause the management server at least to:
  respond to the identification of the first physical host on which to execute the virtual machine by adjusting processor performance states for one or more of the plurality of physical hosts, and adjusting processor operating states for one or more of the plurality of physical hosts.

11. The system of claim 10, wherein the memory stores one or more additional computer executable instructions that, when executed by the processor, cause the management server to output a user interface for configuring one or more optimization preferences.

12. The system of claim 10, wherein the memory stores one or more additional computer executable instructions that, when executed by the processor, cause the management server to output a user interface for configuring one or more weights to apply to the retrieved first and second pluralities of metrics.

13. The system of claim 10, wherein the memory stores one or more additional computer executable instructions that, when executed by the processor, further cause the management server to:
   identify a second physical host of the plurality of physical hosts on which to execute the virtual machine by evaluating a topographic location of the second physical host.

14. The system of claim 10, wherein the memory stores one or more additional computer executable instructions that, when executed by the processor, further cause the management server to:
   identify a second physical host of the plurality of hosts for execution of the virtual machine, the second physical host having a higher second power score than a second physical host in the plurality of physical hosts.

15. The system of claim 10, wherein the retrieved first plurality of metrics including at least a second metric identifying thermodynamic information associated with each of the plurality of physical hosts.

16. The system of claim 10, wherein the retrieved first plurality of metrics including at least a second metric identifying run-state information associated with each of the plurality of physical hosts.

17. The system of claim 10, wherein the computer executable instructions, when executed by the processor, further cause the management server to:
   respond to the identification of the first physical host on which to execute the virtual machine by adjusting the processor operating states of one or more of the plurality of physical hosts in accordance with one or more optimization preferences.

18. The system of claim 10, wherein the memory stores one or more additional computer executable instructions that, when executed by the processor, further cause the management server to:
   generate the first plurality of metrics for each of the plurality of physical hosts.

19. The system of claim 10, wherein the memory stores one or more additional computer executable instructions that, when executed by the processor, further cause the management server to:
   query at least one of the plurality of physical hosts for an identification of a level of usage.

20. One or more non-transitory computer readable media storing computer-executable instructions that, when executed by at least one processor, cause the at least one processor to:
   retrieve a first plurality of metrics for each of a plurality of physical hosts available for executing a virtual machine, the first plurality of metrics including at least a first metric identifying a level of usage for each of the plurality of physical hosts as of a first predetermined time period;
   retrieve a second plurality of metrics associated with the virtual machine, the second plurality of metrics including at least one metric identifying a level of usage exerted on a physical host by the virtual machine as of a second predetermined time period;
   assign a first power score to each of the plurality of physical hosts responsive to the retrieved first and second pluralities of metrics, wherein each first power score is based on the first plurality of metrics and the second plurality of metrics associated with a respective physical host of the plurality of physical hosts;
   identify a particular physical host of the plurality of physical hosts having a highest first power score of the plurality of first power scores, wherein assignment of the plurality of first power scores assigned to the plurality of physical hosts other than the particular physical host is specified in proportion to the highest first power score;
   determine a second power score, for each of the plurality of physical hosts, based at least in part on a metric identifying a level of usage exerted on each of the plurality of physical hosts by the virtual machine as of a third predetermined time period, wherein the metric is from one of the first plurality of metrics or the second plurality of metrics;
   identify a first physical host in the plurality of physical hosts on which to execute the virtual machine, wherein the second power score of the first physical host satisfies at least one predetermined criteria; and
   respond to the identification of the first physical host on which to execute the virtual machine, including:
   i. adjust processor performance states for one or more of the plurality of physical hosts; and
   ii. adjust processor operating states for one or more of the plurality of physical hosts.

21. The method of claim 1, wherein the first predetermined time period is a same time period as the second predetermined time period.

* * * * *